United States Patent [19]

Piekarski

[11] 3,870,654

[45] Mar. 11, 1975

[54] PROCESS AND CATALYST FOR INCREASING THE MOLECULAR WEIGHT OF LOW-PRESSURE POLYETHYLENE

[75] Inventor: Gottfried Piekarski, Burghausen, Germany

[73] Assignee: Wacker-Chemie GmbH, Munich, Germany

[22] Filed: Feb. 7, 1973

[21] Appl. No.: 330,278

[30] Foreign Application Priority Data
Feb. 10, 1972  Germany........................2206386

[52] U.S. Cl. ...... 252/429 B, 252/431 R, 260/94.9 C
[51] Int. Cl.............................................. B01j 11/84
[58] Field of Search ..................... 252/429 B, 431 R

[56]    References Cited
         UNITED STATES PATENTS

| | | | |
|---|---|---|---|
| 3,202,617 | 8/1965 | Enk et al......................... | 252/429 B |
| 3,399,184 | 8/1968 | Azuma et al................ | 252/429 B X |
| 3,440,179 | 4/1969 | Bayer et al..................... | 252/429 B |
| 3,661,878 | 5/1972 | Aishima et al............. | 252/429 B X |
| 3,755,274 | 8/1973 | Piekarski et al............. | 252/429 B X |

Primary Examiner—Patrick P. Garvin
Attorney, Agent, or Firm—Hammond & Littell

[57]          ABSTRACT

A process and catalyst for the production of low-pressure polyethylene powder of increased molecular weight consisting essentially of the reaction product of (a) a polysiloxane containing hydrogen bonded to silicon, (b) a compound of a heavy metal of the IV subgroup of the Periodic System, and (c) an aluminum salt selected from the group consisting of halides, alkoxyhalides and alkoxides, containing further in the reaction mixture prior to commencement of polymerization, (d) an organic tin compound of the formula $$SnR_4$$

wherein R is a member selected from the group consisting of alkyl having 2 to 10 carbon atoms and cycloalkyl having 5 to 10 carbon atoms, said ingredient (d) being present in an amount of from 0.5 to 200 millimols per mol of said compound of ingredient (b).

8 Claims, No Drawings

PROCESS AND CATALYST FOR INCREASING THE MOLECULAR WEIGHT OF LOW-PRESSURE POLYETHYLENE

The production of polyethylene at normal pressure or at pressures of up to 20 atmospheres with catalysts of polymeric organic silicon compounds containing hydrogen bonded to silicon, for example, methyl-hydrogen-polysiloxane, compounds of metals of the IV to VI subgroups of the Periodic System, for example, titanium tetrachloride, and compounds of aluminum, for example, aluminum-chloride, is known (German Published Pat. application DOS No. 1,545,177). It is also known from the state of the art that, if the above-mentioned catalyst is used, an increase of the molecular weight of polyethylene powder can be achieved, among other methods, by the following measures: (1) Reduction of the polymerization temperature, (2) use of mixtures of compounds of subgroups IV and V of the Periodic System for the formation of catalysts, for example, titanium tetrachloride and vanadium oxytrichloride, as well as (3) aging the catalyst. Vanadium compounds are used in the mixtures as a rule in amounts of far over 100 millimols, based on 1 mol of a compound of subgroup IV. All these measures have certain disadvantages. If the polymerization temperature is too low, the polymer yield drops considerably. Vanadium compounds in the above-indicated relatively large amounts, as well as aged catalysts are difficult to dissolve out of the polyethylene and lead to discolorations of the molded articles produced from the polyethylene powder. It has already been suggested to use a mixture of polymeric and monomeric silicon-hydrogen compounds together with compounds of metals of subgroups IV to VI of the Periodic System for the formation of catalysts (British Pat. No. 962,952), by increasing the portion of monomeric silicon compound, the molecular weight of polyethylene is increased. This method is disadvantageous insofar as the suggested monomeric silicon compounds are expensive and difficult to obtain commercially.

OBJECTS OF THE INVENTION

An object of the present invention is the development of a process and a catalyst for the production of a low-pressure polyethylene powder of increased molecular weight and increased uniformity of molecular weight distribution.

Another object of the present invention is the development of a catalyst for the production of low-pressure polyethylene powder of increased molecular weight consisting essentially of the reaction product of (a) a polysiloxane containing hydrogen bonded to silicon, (b) a compound of a heavy metal of the IV subgroup of the Periodic System, and (c) an aluminum salt selected from the group consisting of halides, alkoxyhalides and alkoxides, containing further in the reaction mixture prior to commencement of polymerization, (d) an organic tin compound of the formula $$SnR_4$$

wherein R is a member selected from the group consisting of alkyl having 2 to 10 carbon atoms and cycloalkyl having 5 to 10 carbon atoms, said ingredient (d) being present in an amount of from 0.5 to 200 millimols per mol of said compound of ingredient (b).

A further object of the present invention is the development in a process for the production of low-pressure polyethylene powder of increased molecular weight which comprises polymerizing ethylene containing from 0 to 10 mol% of an α-olefin having 3 to 8 carbon atoms at a temperature of from 20° and 200°C and a pressure of from 1 to 100 atmospheres in the presence of a polymerization catalyst prepared by reaction of (a) a polysiloxane containing hydrogen bonded to silicon, (b) a compound of a heavy metal of the IV subgroup of the Periodic System, and (c) an aluminum salt selected from the group consisting of halides, alkoxyhalides and alkoxides, in an inert liquid suspension media, and recovering said low-pressure polyethylene powder, of the improvement which consists in adding to said polymerization catalyst reaction mixture prior to commencement of said polymerization, (d) an organic tin compound of the formula $$SnR_4$$

wherein R is a member selected from the group consisting of alkyl having 2 to 10 carbon atoms and cycloalkyl having 5 to 10 carbon atoms, said polymerization catalyst ingredient (d) being present in an amount of from 0.5 to 200 millimols per mol of said compound of ingredient (b).

These and other objects of the present invention will become more apparent as the description thereof proceeds.

DESCRIPTION OF THE INVENTION

A method has been found for increasing the molecular weight and uniformity of molecular weight distribution of low-pressure polyethylene, which is obtained by polymerization of ethylene or of a mixture of ethylene and up to 10 mol % of an α-olefin, based on the ethylene, at temperatures of between 20°C and 200°C and a pressure of 1 to 100 atmospheres, using catalysts of (a) polysiloxanes containing hydrogen bonded to silicon (b) compounds of elements of the IV subgroup of the Periodic System and (c) halides, oxyhalides or alkoxides of aluminum. This improved method is characterized in that reaction mixtures are used as catalysts which are formed from (a), (b) and (c), and contain a further ingredient (d) organic tin compounds of the general formula $$SnR_4$$

wherein each R denotes an identical or different aliphatic or cycloaliphatic radical.

More particularly, the invention involves in a process for the production of low-pressure polyethylene powder of increased molecular weight which comprises polymerizing ethylene containing from 0 to 10 mol% of an α-olefin having 3 to 8 carbon atoms at a temperature of from 20°C and 200°C and a pressure of from 1 to 100 atmospheres in the presence of a polymerization catalyst prepared by reaction of (a) a polysiloxane containing hydrogen bonded to silicon, (b) a compound of a heavy metal of the IV subgroup of the Periodic System, and (c) an aluminum salt selected from the group consisting of halides, alkoxyhalides and alkoxides, in an inert liquid suspension media, and recovering said low-pressure polyethylene powder, the improvement which consists in adding to said polymerization catalyst reaction mixture prior to commencement of said polymerization, (d) an organic tin compound of the formula

$$SnR_4$$

wherein R is a member selected from the group consisting of alkyl having 2 to 10 carbon atoms and cycloalkyl having 5 to 10 carbon atoms, said polymerization catalyst ingredient (d) being present in an amount of from 0.5 to 200 millimols per mol of said compound of ingredient (b).

The improved catalyst is likewise part of the present invention and is a catalyst for the production of low-pressure polyethylene powder of increased molecular weight consisting essentially of the reaction product of (a) a polysiloxane containing hydrogen bonded to silicon, (b) a compound of a heavy metal of the IV subgroup of the Periodic System, and (c) an aluminum salt selected from the group consisting of halides, alkoxyhalides and alkoxides, containing further in the reaction mixture prior to commencement of polymerization (d) an organic tin compound of the formula $$SnR_4$$

wherein R is a member selected from the group consisting of alkyl having 2 to 10 carbon atoms and cycloalkyl having 5 to 10 carbon atoms, said ingredient (d) being present in an amount of from 0.5 to 200 millimols per mol of said compound of ingredient (b).

The method and catalyst according to the invention avoids not only the above-described disadvantages, but it also increases the catalyst activity, while the content of catalyst residues in the polyethylene polymer is reduced. Furthermore, the polyethylene thus produced shows a narrower molecular weight distribution, which can be of advantage for certain uses.

Even small amounts of tin tetraalkyl show, in mixture with the presently used three components (a), (b) and (c), a clearly increased activity of the catalyst and a remarkable increase of the molecular weight of the polyethylene obtained. Furthermore, the residual ash content from the catalyst residues in polyethylene are clearly reduced with comparable yields, if the catalysts according to the invention are used.

These findings were surprising and could not be foreseen, particularly since no chemical reactions are known between polysiloxanes, component (a), and tin-tetraalkyls, component (d), under the selected catalyst preparation conditions or polymerization conditions. There is also no reaction between aluminum chloride, for example, component (c), and tin tetraalkyls (U.S. Pat. No. 3,225,022, Example 2). At elevated temperatures there is only a dissolution of the aluminum compound in tin tetraalkyl.

From the state of the art, it is also known to use catalysts prepared from the categories b, c and d (Swiss Pat. No. 357,196 and French Pat. No. 1,160,375). Under the working conditions according to the invention, where the amount of the tin compound, for example, tin tetrabutyl, is low in the 4-component system (a) to (d) compared to the amount of the compounds of the subgroup IV elements used., e.g., TiCl$_4$, very little polymer is obtained with a catalyst system of (b), (c) and (d). Even with larger amounts of tin tetraalkyl, for example, 0.67 mols per mol of TiCl$_4$, no satisfactory results are obtained in terms of yield and bulk density, since, through the reduction of TiCl$_4$, the chloro-tin trialkyl, for example, chloro-tin tri-n-butyl is produced and this reaction greatly disturbs the catalytic activity of an anionic ethylene polymerization by its polar and complexing properties. It must therefore be considered surprising that excellent catalysts are formed by the additional use of hydrogen-polysiloxanes.

As polymeric silicon compounds (category a) containing hydrogen bonded to silicon, polysiloxanes are utilized of the general formula

where R is alkyl having 1 to 6 carbon atoms, cycloalkyl having 5 to 6 carbon atoms and aryl, such as phenyl, and where the terminal silicons of the polymer are satisfied with R, particularly those polysiloxanes having a viscosity of from 5 to 100 cSt at 25°C. Particularly recommended are the compounds of the above viscosity: methyl-hydrogen-polysiloxane, ethyl-hydrogen-polysiloxane and phenyl-hydrogen-polysiloxane. Preferably 1.5 to 2.5 mols of a polysiloxane containing hydrogen bonded to silicon are employed per mol of the compound of a heavy metal of the IV subgroup in the formation of the catalyst. The molecular weight of the polysiloxane containing hydrogen bonded to silicon as calculated for the above molar ratio is based on the monomer unit —R—Si—H—O—. For methyl-hydrogen-polysiloxane, the molecular weight is calculated as 60 from the CH$_3$SiHO unit.

Preferably, the halides, oxyhalides or mixtures, or mixtures of halides and alkoxides of heavy metals of the IV subgroup of the Periodic System are employed as compounds of a heavy metal of the IV subgroup of the Periodic System (category b), for example TiCl$_4$, TiCl$_3$, TiBr$_4$, TiCl$_3$ (O-n-butyl), Ti (O-n-butyl)$_4$. Titanium compounds with organic radicals combined directly with the metal, such as the cyclopentadienyl (Cp) or alkyl compounds of titanium, for example (Cp)$_2$TiCl$_2$ or CH$_3$TiCl$_3$, can also be used for the formation of the catalyst. Compounds of the elements subgroup V and/or VI of the Periodic System can also be used together with the compound of a metal of the subgroup IV of the Periodic System; e.g., TiCl$_4$. For the above-mentioned reasons, the amount of the addition of these compounds, individually or as a mixture, should not exceed 50 millimols based on 1 mol of a compound of subgroup IV of the Periodic System. Examples of such compounds of the V and/or VI subgroups are VOCl$_3$, VCl$_4$, VCl$_3$, CrO$_2$Cl$_2$ and CrO$_2$Cl(O-n-propyl). Even minute amounts of 30 millimols of VOCl$_3$, for example, based on 1 mol of TiCl$_4$, for example, used together with the 4 components according to the invention for the formation of the catalyst, effect a very great increase of the molecular weight. Obviously we are dealing here with a synergistic effect.

Compounds of category a are the halides, alkoxyhalides or alkoxides of aluminum or mixtures of these compounds, such as AlCl$_3$, AlBr$_3$, AlCl 2 (O-n-propyl) and Al(O-i-butyl)$_3$. The commercially available solid complex of the formula 3 TiCl$_3$. AlCl$_3$ can also be used. The amount of the aluminum compound used is small and should not exceed 200 millimols per mol of a compound of the metal of the IV subgroup. Preferably 8 to 100 millimols of aluminum compound are used for the formation of the catalyst.

As example of the tin tetraalkyls used according to the invention, which contain mostly alkyls having 2 to 10 carbon atoms, are mentioned: $Sn(C_2H_5)_4$, $Sn(i-propyl)_4$, $Sn(n-butyl)_4$ and $Sn(2-ethylhexyl)_4$. Preferably tin tetrabutyl is used, which is commercially available in sufficient purity. It should be free as far as possible of chlorine-containing compounds, like chlorotin tributyl.

The mounts of tin compounds used, particularly of tin tetrabutyl, are frequently 0.5 to 200 millimols, preferably 3 to 100 millimols per mol of the compound of a heavy metal of the IV subgroup of the Periodic System.

Very good results for the production of low-pressure polyethylene or low-pressure polyethylene modified with α-olefins with comparably higher molecular weights are obtained with a catalyst or methyl-hydrogen-polysiloxane, titanium tetrachloride, aluminum chloride and tin tetrabutyl.

The tin compound is preferably added to the other 3 components in such a way that the mixture of hydrogen-polysiloxane and of the tin compound is reacted first with the aluminum compound, and that this reaction mixture is reacted with the metal compound or metal compounds of the subgroup(s) of the Periodic System. A solution of the aluminum compound, e.g. $AlCl_3$, and tin tetrabutyl, for example, can be used for the first reaction with the silicon compound. But it is also possible to combine all 4 reaction partners without a preliminary reaction, and then to react them by heating to form the catalyst. It is also possible to change the order of the reaction so that the aluminum compound and the titanium compound, for example, are heated first at 50°C, for example, for a short time, for example ½ hour: if necessary, in the presence of the monomer to be polymerized, and that this reaction mixture is then reacted with the mixture of the tin compound and silicon compound to form the catalyst. The reaction conditions between the aluminum compound and silicon compound as well as between the resulting reaction mixture and the titanium compound, for example, are known from the state of the art. It is also known that these reactions are carried out in the absence or presence of small quantities of an inert liquid suspension media, which is also used for the polymerization in the suspension polymerization method. Such suspension agents are, for example, hexane, heptane, isooctane, methylcyclohexane or dimethylcyclohexane, as well as paraffin-hydrocarbon mixtures in the boiling range of 110°C to 140°C. The catalysts according to the invention can also be used for the polymerization of the gaseous phase of ethylene or ethylene /α-olefin mixtures.

It is also possible to add a part of the organic tin compound, component $d$, to the inert, liquid suspension media, which is used to maintain a thorough mixing of the polymerization mixture. This measure is particularly advisable when the polymer is to have a high bulk density. The portion of component $d$ which is added to the solvent can be varied within wide limits and can amount to 0.5% to 95% of the total amount of the tin compound. If component $d$ is completely omitted in the formation of the catalyst and added only to the suspension media, the advantageous features of the method are partly to greatly impaired, which manifests itself particularly in higher catalyst residues in the polymer.

If necessary, for example, if a high bulk density of the polymer of over 400 gm/l, for example, is more important than a low ash content in the polyethylene, 85% of the tin tetrabutyl otherwise used for the formation of the catalyst, can be added to the suspension media. Ordinarily, however, from 1% to 50% of the total weight of the tin compound may be added to the inert liquid suspension media prior to commencement of the polymerization.

The polymerization can be effected continuously or intermittently. Preferably, the polymerization is carried out at higher ethylene pressure of 5 to 15 atmospheres and at temperatures of between 50°C and 100°C. By adding up to 10 mol% of an α-olefin, based on the ethylene, the polymer can be modified, that is, it can be reduced in its density. The α-olefins are preferably those containing 3 to 8 carbon atoms, such as, for example, propylene butene-1, pentene-1,hexene-1 and 4-methylpentene-1.

Low-pressure polyethylenes of a relatively high molecular weight are of particular advantage for the production of molded articles when they are to show great toughness, a high resistance to tension crack corosion, and a low tendency to brittling. Primarily sheets, pipes and hollow bodies are produced from these polymers by extrusion.

The following examples are illustrative of the practice of the invention without being limitative in any respect.

EXAMPLES

The polymers can be produced with the catalyst according to the invention have a molecular weight between 50,000 and 1,000,000, depending on the catalyst and the polymerization conditions. The determination of the viscosometric molecular weight was effected and reported as the reduced specific viscosity $\eta$ red, which was measured at a concentration of 0.1% by weight in Decalin at 135°C and indicated in dl/g, according to Wesslau, Kunstoffe, 49, 230 (1959) and Tung, High Polymers, 20, 514 (1956).

The non-uniformity $U = \bar{M}_w/\bar{M}_n - 1$ was used as a measure for the molecular weight distribution, where the data for the average weight of the molecular weight, $\bar{M}_w$ and for the numerical average of the molecular weight $\bar{M}_n$ were obtained from summmation equations according to Cottam, J. of Appl. Pol. Sci. 9, 1853-62 (1965) from the weights and the values of the viscosimetric average molecular weight $\bar{M}_v$ of individual fractions from a column-fractioning according to Francis, J. Pol. Sci. 31, 453-66 (1958).

The density of the polymers was measured on strips of pressed discs of 1 mm thickness according to the buoyancy method in g/cc (DIN 53479 ). The bulk weight (bulk density) was measured according to DIN 53468 in g/l. The ash of the polyethylene was determined by ashing and indicated in ppm.

The DIN methods are those of "Deutsche Industrienormalien," German industrial standards, as published.

EXAMPLES 1 – 6

For the polymerization of ethylene at normal pressure and 75°C in a 50 ml vessel equipped with a stirrer, 5 catalysts were prepared from methyl-hydrogen-polysiloxane (density 1.00 g/cc, viscosity 32 cSt at 25°C) $AlCl_3$, tin tetrabutyl (density 1.057 glcc) and $TiCl_4$, at 50°C for 5 hours. $AlCl_3$ is reacted with a mixture of polysiloxane and tin tetrabutyl, prior to the preparation of the catalyst, by heating this mixture briefly to 45°C and dissolution occurs in this reaction. The catalyst for Example 1 was prepared in a similar manner, but contains no tin compound. This example serves as a control. The catalyst components, polysiloxane, AlCl$_3$, tin compound and TiCl$_4$ were in a ratio of 1.8 mols: 50 millimols: 16.7 to 201 millimols: 1 mol. The polymerization was carried out in 1.2 liter of isooctane for 3 hours with 3.5 gm of catalyst, based on the starting components used for the formation of the catalyst, with addition of the indicated amount of tin tetrabutyl in each case. The purification of the polymers was effected in known manner by adding an aliphatic alcohol, for example, ethanol, filtration of the polymer suspension, washing the filter cake, and drying the polyethylene. Table I gives the results of the examples.

TABLE I

| Example No. | Millimol Sn(C$_4$H$_9$)$_4$ per mol TiCl$_4$ | Polyethylene gm | η red dl/gm | bulk density gm/l | ashes ppm |
| --- | --- | --- | --- | --- | --- |
| 1 | — | 200 | 2.13 | 192 | 2,170 |
| 2 | 16.7 | 270 | 3.0 | 200 | 1,350 |
| 3 | 33.4 | 310 | 3.2 | 305 | 930 |
| 4 | 67 | 290 | 3.3 | 305 | 820 |
| 5 | 134 | 208 | 3.6 | 340 | 1,010 |
| 6 | 201 | 195 | 3.6 | 316 | 1,230 |

The best results are obtained in the range of 16.7 to 67 millimols of tin tetrabutyl per mol of TiCl$_4$.

If a catalyst was prepared in a similar manner from 0.25, 1 or 3 ml of tin tetra butyl, 0.3 gm AlCl$_3$ each time and 5 ml TiCl$_4$ each time (molar ratio 16.7 or 67 or 201 mM: 50 mM: 1 mol), but without using a hydrogen-polysiloxane, and an attempt was made to polymerize ethylene under similar conditions, only 1 to 2 gm of polymer were obtained. If catalysts were prepared in a similar manner from 5 ml Sn(C$_4$H$_9$)$_4$, 0.1 to 1 gm of AlCl$_3$, and 0.65 to 2.5 ml TiCl$_4$ (molar ratio tin compound to TiCl$_4$ 0.67 to 2.58 mols: 1 mol), after a similar polymerization only a maximum of 100 gm of polyethylene were obtained, the bulk densities of which were only 100 to 200 gm/l.

EXAMPLE 7

This example was carried out similar to Example 3. Tin tetrabutyl, however, was added only after the reaction phase hydrogen-polysiloxane-AlCl$_3$ was first formed. A homogenous solution was formed. After addition of TiCl$_4$ a heterogenous catalyst formation started immediately. After 3 hours of polymerization, 314 gm of polyethylene with the following properties were obtained:

η red: 2.98 dl/gm
bulk density: 325 gm/l
ash: 460 ppm

EXAMPLE 8

A solution was prepared at 115°C under inert gas with stirring, from 15.7 ml of tin tetrabutyl and 6.4 gm of AlCl$_3$ (molar ratio 1:1). 1 ml of this solution was diluted at 50°C with 10 ml of methyl-hydrogen-polysiloxane and then 10 ml of TiCl$_4$ were added dropwise. An orange-reddish coloration appeared immediately, and after a short time a dark brown heterogenous deposit was formed. The further preparation of the catalyst was effected for 5 hours at 50°C. Under the polymerization conditions indicated for the Examples 2 to 6, normal pressure, 75°C, 3 hours, 295 gm of high-molecular-weight polyethylene was obtained, which can be pressed or extruded to give tough molded articles with the following properties:

η red: 3.2 dl/gm
bulk density: 310 gm/l
density: 0.952 gm/cc
U : 10.5
ash: 420 ppm A catalyst prepared in a similar manner without the tin compound yielded at a polymerization temperature of 65°C and other equal polymerization conditions, polyethylene with a similar high molecular weight, both with a greatly reduced yield, due to the lower polymerization temperature, and with the following disadvantageous properties:

η red: 2.95 dl/gm
bulk density: 185 gm/l
density: 0.954 gm/cc
U : 15.4
ash: 1,800 ppm

EXAMPLES 9 – 13

In a catalyst-preparation vessel, a catalyst was prepared in 4 hours at 70°C from 10 ml of methyl-hydrogen-polysiloxane, 0.2 ml of tin tetrabutyl, 0.6 gm of AlCl$_3$ and 10 ml of TiCl$_4$ in a small amount of heptane. 1.5 gm of catalyst, based on the starting materials were used in a 1-liter glass autoclave for an ethylene pressure polymerization. Polymerization conditions: 10 atmospheres, 75°C, 600 ml heptane, 300 RPM. In addition, increasing amounts of 0.03 to 0.15 ml of tin tetrabutyl were added to the suspension medium. Table II gives the test results.

TABLE II

| Example No. | Addition ml Sn(C$_4$H$_9$)$_4$ | Polyethylene gm | η red dl/gm | bulk density gm/l |
| --- | --- | --- | --- | --- |
| 9 | — | 232 | 2.4 | 357 |
| 10 | 0.03 | 207 | 3.6 | 367 |
| 11 | 0.05 | 250 | 3.65 | 396 |
| 12 | 0.1 | 260 | 4.01 | 410 |
| 13 | 0.15 | 227 | 4.08 | 367 |

Obviously an optimum effect with regard to increased yields, molecular weight and bulk density is achieved with an addition of 0.05 to 0.1 ml of Sn(C$_4$H$_9$)$_4$ (total 33 to 66 mM per mol of TiCl$_4$) per polymerization batch. Other additions of tin compound in the suspension agent yielded no further increases in the molecular weight. The ash values of the 5 test products were generally between 600 and 800 ppm. No clear differences could be found.

EXAMPLES 14 – 15

As described in Example 11, but with the addition of 0.25 ml VOCl$_3$ (30 millimols related to 1 mol TiCl$_4$) for the preparation of the catalyst, a catalyst was prepared. H-polysiloxane, AlCl$_3$ and tin compound were dissolved first in a small amount of heptane at 45°C. Then TiCl$_4$ and VOCl$_3$ were added, and the catalyst was prepared. After the ethylene polymerization and workup, 244 gm of polyethylene were obtained, whose molecular weight was greatly increased and which could be pressed to extremely tough plates:

η red: 6.4

A similar polymerization at 85°C yielded 271 gm of polyethylene. The polyethylene obtained had a η red of 4.1 and a bulk density of 405 gm/l. Comparative tests at 85°C without the tin and vanadium compounds in the catalyst and in the suspension agent, yielded polyethylenes in the η red range of 1.8 to 1.9 with a higher wax portion.

EXAMPLE 16

Proceeding as in Example 14, but with an addition for the preparation of the catalyst of a mixture of 0.1 ml of $VOCl_3$ and 0.16 ml of $CrO_2Cl_2$, a catalyst was prepared. Under similar polymerization conditions 232 gm of polyethylene with a η red of 5.8 were obtained.

EXAMPLE 17

Ethylene was polymerized continuously in a 25 liter autoclave. Conditions: 73°C, 10 atmospheres, 5 gm/hour of catalyst added (based on the starting materials used). The catalyst was prepared in a larger amount at 40°C for 6 hours from 4 components with a quantitative ratio of 5 ml of methyl-hydrogen-polysiloxane to 0.3 gm of $AlCl_3$ to 0.5 ml of tin tetrabutyl to 5 ml of $TiCl_3$. The individual components were combined successively without a special preliminary reaction. 69.6 kg of polyethylene were obtained in exothermic polymerization after a polymerization time of 50 hours, with the following properties:

η red: 3.1
bulk density: 410 gm/l
density: 0.953 gm/cc
U : 9.7
ash: 90 ppm

A similar comparison test without the use of tin tetrabutyl yielded, during the same polymerization time, 67.2 kg of polyethylene with the following properties:

η red: 2.08
bulk density; 410 gm/l
density: 0.956 gm/cc
U : 10.5
ash: 450 ppm

EXAMPLE 18

This example was carried out in a similar manner as Example 17, continuous polymerization test, continuously, adding in addition to ethylene 4.5 mol% of butene-1, based on the ethylene added, dissolved in the suspension media. After a polymerization time of 54 hours, 61 kg of polyethylene powder were obtained with a modified density and the following properties:

η red: 2.7
bulk density: 400 gm/l
density: 0.947 gm/cc  U : 9.1
ash: 105 ppm

The preceding specific embodiments are illustrative of the practice of the invention. It is to be understood, however, that other expedients known to those skilled in the art or described herein may be employed without departing from the spirit of the invention or the scope of the appended claims.

I claim:

1. In a catalyst for the production of low-pressure polyethylene powder of increased molecular weight consisting essentially of the reaction product of (a) from 1 to 3.5 mols of a polysiloxane containing hydrogen bonded to silicon having the formula

wherein R is a member selected from the group consisting of alkyl having 1 to 6 carbon atoms, cycloalkyl having 5 to 6 carbon atoms and aryl, and the terminal silicons of the polymer are satisfied with R, (b) 1 mol of a titanium compound selected from the group consisting of the halides, oxyhalides and mixtures of the halides and alkoxides, and (c) from 5 to 200 millimols of an aluminum salt selected from the group consisting of halides, alkoxyhalides and alkoxides, the improvement of adding to the reaction mixture in the absence of ethylene, (d) an organic tin compound of the formula $SnR_4$ wherein R is a member selected from the group consisting of alkyl having 2 to 10 carbon atoms and cycloalkyl having 5 to 10 carbon atoms, said ingredient (d) being present in an amount of from 0.5 to 200 millimols per mol of said compound of ingredient (b).

2. The catalyst of claim 1 wherein the molar ratio of ingredients (a), (b), (c) and (d) is 1.5 to 2.5 mols of (a): 1 mol of (b): 8 to 100 millimols of (c): 3 to 100 millimols of (d).

3. The catalyst of claim 2 wherein said reaction product contains from 0 to 50 millimols of at least one compound selected from the group consisting of $VOCl_3$, $VCl_4$, $VCl_3$, $CrO_2Cl_2$ and $CrO_2Cl$ (O-n-propyl).

4. The catalyst of claim 1 wherein from 0.5% to 95% of the total amount of said ingredient (d) is added after formation of the basic catalyst and in the absence of ethylene.

5. The catalyst of claim 2 wherein said ingredient (a) is methyl-hydrogen-polysiloxane.

6. The catalyst of claim 2 wherein said ingredient (b) is titanium tetrachloride.

7. The catalyst of claim 2 wherein said ingredient (c) is aluminum chloride.

8. The catalyst of claim 2 wherein said ingredient (d) is tin tetrabutyl.

* * * * *